US010759058B2

(12) United States Patent
Frauen et al.

(10) Patent No.: US 10,759,058 B2
(45) Date of Patent: Sep. 1, 2020

(54) PROCESSING DEVICE FOR THE ASSEMBLY OF AIRCRAFT

(71) Applicant: Airbus Operations GmbH, Hamburg (DE)

(72) Inventors: Holger Frauen, Hamburg (DE); Sven Buttkereit, Hamburg (DE)

(73) Assignee: Airbus Operations GmbH (DE)

( * ) Notice: Subject to any disclaimer, the term of this patent is extended or adjusted under 35 U.S.C. 154(b) by 488 days.

(21) Appl. No.: 14/824,425

(22) Filed: Aug. 12, 2015

(65) Prior Publication Data

US 2016/0046393 A1 Feb. 18, 2016

(30) Foreign Application Priority Data

Aug. 18, 2014 (DE) .......................... 10 2014 111 747

(51) Int. Cl.
*B64F 5/10* (2017.01)
*B25J 11/00* (2006.01)
*B25J 5/02* (2006.01)

(52) U.S. Cl.
CPC .............. *B25J 11/005* (2013.01); *B25J 5/02* (2013.01); *B64F 5/10* (2017.01); *Y10S 901/27* (2013.01); *Y10S 901/41* (2013.01)

(58) Field of Classification Search
CPC ... B64F 5/0009; B64F 5/10; B25J 5/02; B25J 11/005; Y10S 901/27; Y10S 901/41
See application file for complete search history.

(56) References Cited

U.S. PATENT DOCUMENTS

| 4,967,947 | A | * | 11/1990 | Sarh | ......................... | B21J 15/14 227/156 |
| 5,661,892 | A | | 9/1997 | Catania et al. | | |
| 5,896,637 | A | | 4/1999 | Sarh | | |
| 6,314,630 | B1 | | 11/2001 | Munk et al. | | |
| 6,505,393 | B2 | | 1/2003 | Stoewer et al. | | |
| 8,051,547 | B2 | * | 11/2011 | Toh | .......................... | B21J 15/14 29/464 |
| 8,657,274 | B2 | | 2/2014 | Hazlehurst et al. | | |
| 2001/0054228 | A1 | * | 12/2001 | Lehmker | .................. | B21J 15/10 29/701 |
| 2008/0155807 | A1 | * | 7/2008 | Toh | .......................... | B21J 15/14 29/525.01 |

(Continued)

FOREIGN PATENT DOCUMENTS

CN 1213998 A 4/1999
CN 101646512 A 2/2010

(Continued)

*Primary Examiner* — Lawrence Averick
(74) *Attorney, Agent, or Firm* — Lerner, David, Littenberg, Krumholz & Mentlik, LLP

(57) ABSTRACT

A processing device for the assembly of an aircraft encompasses a positioning frame, a guide device and a movable tool arm. The positioning frame can be attached to a segment of a hall floor. The guide device is movably guided on the positioning frame. The movable tool arm is attached to the guide device, and its free end exhibits a tool holder. The processing method for the assembly of aircraft encompasses the steps of providing a positioning frame on a segment of the hall floor, and guiding a guide device on the positioning arm. The guide device here exhibits a movable tool arm, and a free end of the tool arm exhibits a tool holder.

7 Claims, 4 Drawing Sheets

(56) References Cited

U.S. PATENT DOCUMENTS

2011/0054694 A1* 3/2011 Munk .................. B25B 11/02
                                                                700/275

FOREIGN PATENT DOCUMENTS

| DE | 602 12 170 T2 | 4/2007 |
|----|---------------|--------|
| EP | 0620060 A2    | 10/1994 |
| EP | 0976473 A2    | 2/2000 |

* cited by examiner

PROCESSING DEVICE FOR THE ASSEMBLY OF AIRCRAFT

FIELD OF THE INVENTION

The invention relates to a processing device and a processing method for the assembly of aircraft.

BACKGROUND OF THE INVENTION

In known methods for the assembly of aircraft, at least one hull part and a floor grate can initially be joined together. Additional hull parts can then be added, until an essentially annular fuselage section has been formed. Several fuselage sections can be joined together to form longer fuselage segments.

Before or after these steps, additional components of the aircraft can be preassembled or finally assembled. These components can be brackets for line systems, the line systems themselves, technical equipment, devices and the like, e.g., thermal insulation, hydraulic, electrical, water and air conditioning lines, electrical and optical control lines, mounting rails, seating rails, the seats themselves, etc.

It is inherently difficult to assemble such components under what are most frequently cramped installation conditions in aircraft. It is virtually impossible to use heavy means of production, such as lifting devices, handling systems, scaffolds or the like, since the floor grate is not designed for such mechanical loads, for example. Some components have to be assembled in unfavorable operating positions, e.g., connecting elements overhead, which is ergonomically and economically costly.

One essential goal is thus to facilitate the assembly of aircraft.

BRIEF SUMMARY OF THE INVENTION

An aspect of the invention is to propose a processing device and processing method that facilitates the assembly of aircraft.

It is proposed that a processing device for the assembly of aircraft be provided, which encompasses a positioning frame, a guiding device and a movable tool arm. The positioning frame can be attached to a section of a hall floor. The guiding device is movably guided on the positioning frame. The movable tool arm is attached to the guiding device, and its free end exhibits a tool holder.

Such a processing device for the assembly of aircraft significantly facilitates the assembly of aircraft. The level of automation can be elevated, i.e., robots can do more of the work performed by humans. This makes it possible to raise the quality of production, and also the quickness and flexibility of responses to changing requirements, while diminishing the load and danger faced by humans, time requirements and production costs.

In addition, the processing operations during the assembly of aircraft can be adjusted to what are most often cramped installation conditions in aircraft, making it unnecessary to use heavy production aids, such as lifting devices, scaffolds or the like. Humans also do not have to operate in ergonomically unfavorable work positions.

The processing device according to the invention can also be flexibly adjusted to the aircraft model to be assembled. Two such processing devices or two guiding devices can be used on a positioning frame or two tool arms can be used on a guiding device, parallel one next to and/or one on top of the other. For example, assembly work can in this way be performed in two aisles that run next to and/or on top of each other between two rows of seats on board spacious aircraft. The processing device according to the invention can also be used during the assembly of single-hull or multi-hull aircraft models.

The positioning frame can encompass a support structure comprised of several carriers configured like a framework. The positioning frame can encompass at least one control and/or media line, e.g., a power or pressure line to supply the movable tool arm, tool holder and/or tool to be accommodated therein.

The guiding device can be a device for moving, controlling and/or guiding the entire processing device, the movable tool arm, the tool holder and/or the tool to be accommodated therein.

The movable tool arm can be a robot arm, a tripod, a hexapod, combinations thereof or the like. In addition to the tool holder, the tool arm can encompass a drive and controller for moving the tool arm, the tool holder and/or the tool to be accommodated therein.

The tool holder can be a holder for a tool used in processing aircraft components for assembling the aircraft. These components can be brackets for line systems, the line systems themselves, technical equipment, devices and the like, e.g., a thermal insulation, hydraulic, electrical, water and air conditioning lines, electrical and optical control lines, mounting rails, seating rails, the seats themselves, etc. The tool holder can also be a tool changer.

The tool for processing components of the aircraft can be a drilling tool, a countersinking tool, a riveting tool, a sealing tool, a laser, some other production tool, a measuring tool, combinations thereof or the like.

The aircraft can be an airplane, a helicopter, an unmanned airplane or the like.

The positioning frame can be attached to a section of a hall floor. The term "hall floor" stands for any type of floor on which the aircraft to be assembled is standing. The hall floor can also be a floor outside of a hall. The positioning frame can be detachably connected with the hall floor by means of a carrying element, e.g., carriers, supports, columns, frames or the like. This means that the positioning arm is connected with the carrying element, and the carrying element is connected with the hall floor. While the connections can be detachable screw joints, the mentioned elements can also merely rest on each other.

The positioning frame can additionally be connected with a segment of an aircraft to be assembled. The aircraft segment can be a fuselage segment or a floor segment of the aircraft. The fuselage segment can be a hull segment, a stringer, a frame or the like. The floor segment can be a floor grate, a cross member of a floor grate, a floor plate, a mounting floor plate, a mounting rail, a seating rail or the like. Viewed in the longitudinal direction of the aircraft, the positioning frame can be connected from above or below with the floor segment of the aircraft. Intermediate positions are also possible. The connection between the positioning frame and aircraft segment can be a detachable attachment, e.g., one made via bolting, clamping or with suction.

The positioning frame can be essentially horizontal to the aircraft or inclined relative to the horizontal. The positioning frame can be essentially parallel to the longitudinal axis of the aircraft or swiveled relative to the longitudinal axis of the aircraft.

The guiding device can be movably guided on an upper surface, a lateral surface and/or a lower surface of the positioning frame. The guiding device can be movably guided on the support structure of the positioning frame and in particular on the carrier of the support structure. Rails, chains, belts or the like can be used for movable guidance. Such a guiding means, e.g., the rail, can be detachably connected with the positioning frame by way of a click connection.

The movable tool arm can be directly attached to the guiding device, the tool arm can be attached to the guiding device by way of a support arm, and/or the tool arm can be attached to the guiding device by way of a carriage. Viewed in the longitudinal direction of the aircraft, the movable tool arm can be situated next to, above and/or below the guiding device.

The carriage can encompass an arm to be attached to the guiding device and another arm or a platform for carrying the movable tool arm from below or to hold the movable tool arm from above. Relative to the fuselage segment and viewed in the longitudinal direction of the aircraft, the carriage can here be situated horizontally below or above the movable tool arm, or vertically next to the movable tool arm.

The carriage can further exhibit at least one support device to provide support on a floor plate, a mounting floor plate or the like. The support device can thus be designed to interact with a mounting rail, a seating rail or the like. The support device can be a sliding or rolling element, e.g., a runner or a roller.

The free end of the movable tool arm not attached to the guide device exhibits a tool holder. The tool holder can be an interface or end effector, to which the tool for processing aircraft components is to be attached. The tool can be detachably attached to the tool holder, e.g., by means of a plug connection, screwed connection or the like.

A drive element for moving the guide device relative to the positioning frame can be secured to the positioning frame and/or guide device. The guide device can be moved relative to the positioning frame electrically, mechanically, hydraulically or in some other way. The driving forces can be transmitted by way of chains, belts, rails, inductively or in some other way.

The guide device, tool arm and/or tool holder can exhibit at least one sensor element for determining the position. The position can be determined roughly in a first step, and precisely in a second step. Rough position determination can take place relative to the aircraft, and precise position determination can take place locally, e.g., relative to the cross member. The position can be determined by means of a distance sensor.

The tool arm can be designed so as to control the tool holder based on a template, i.e., the tool in the tool holder or processing point (tool center point) is inserted into the template, e.g., which determines the hole or rivet pattern to be fabricated. The device can be fixed in this position, in which processing can take place. This method is very precise.

The tool arm can alternatively or additionally be designed to be controlled based on prescribed processing and position data. In this case, for example, the coordinates and desired configuration of a hole or rivet pattern are present. This method is very fast and flexible.

In addition, the invention relates to a processing method for the assembly of aircraft. The method encompasses the following steps:
  Attaching a positioning frame to a segment of the hall floor, and
  Guiding a guide device to the positioning frame.

The positioning frame can encompass a support structure. The term "hall floor" stands for any type of floor on which the aircraft to be assembled is standing. The positioning frame can be detachably connected with the hall floor by means of a carrier element, e.g., carriers, supports, columns, frames or the like. The guide device can be a device for moving, controlling and/or guiding the entire processing device, the movable tool arm, the tool holder and/or the tool to be accommodated therein.

The guide device exhibits a movable tool arm, and the free end of the tool arm exhibits a tool holder. The movable tool arm can be a robot arm, a tripod, a hexapod, combinations thereof or the like. The tool holder can be a holder for a tool used in processing aircraft components for assembling the aircraft. The tool can be a drilling tool, a countersinking tool, a riveting tool, a sealing tool, a laser, some other production tool, a measuring tool, combinations thereof or the like.

BRIEF DESCRIPTION OF THE DRAWINGS

Additional features, advantages and possible applications of the present invention may be gleaned from the following description of exemplary embodiments and the figures. All described and/or graphically depicted features here comprise the subject matter of the invention, whether taken in isolation or combined in any way, even independently of their composition in the individual claims or back references thereto. Identical reference numbers on the figures stand for the same or similar objects.

DETAILED DESCRIPTION

Figure 1:
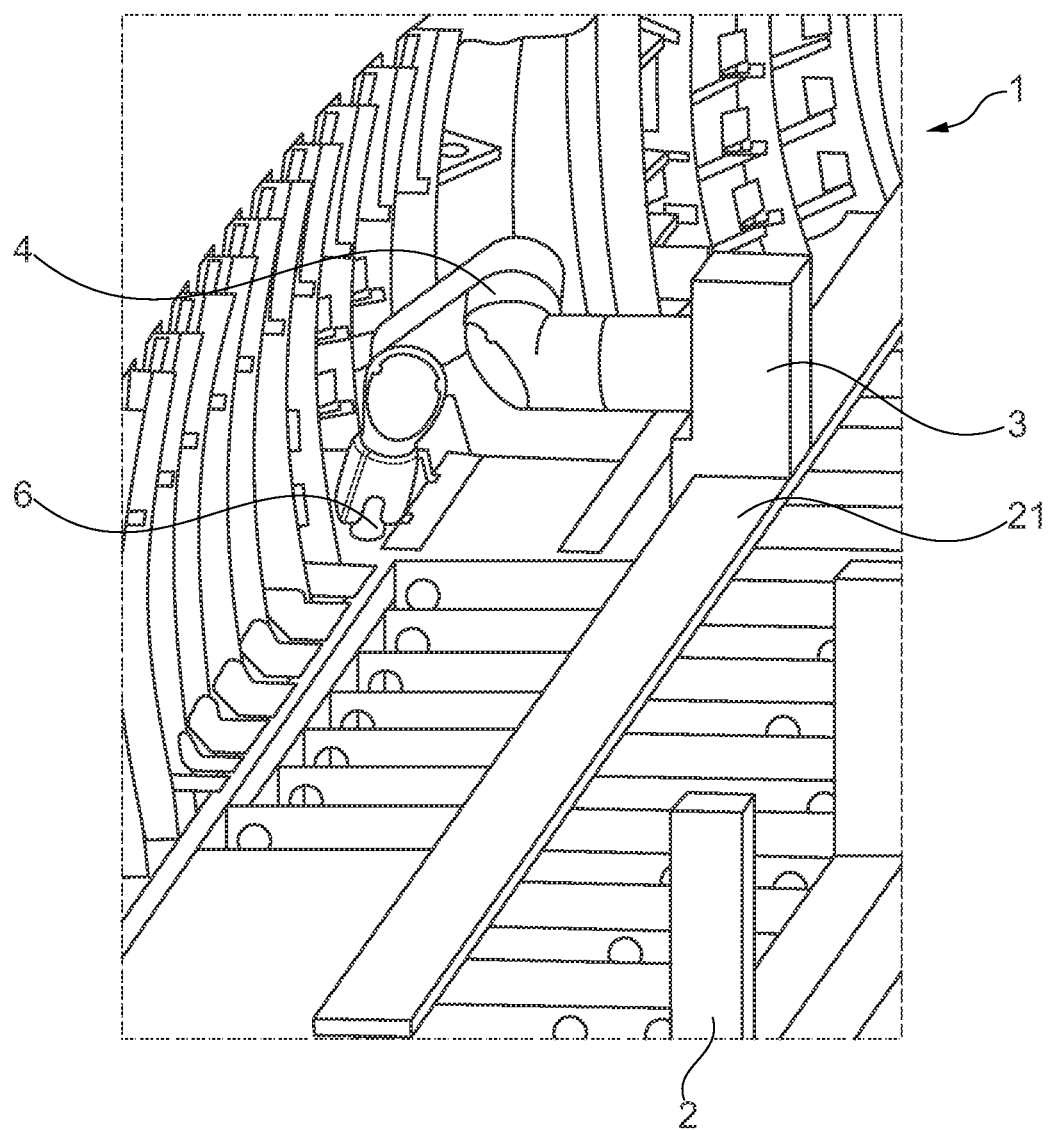
FIG. 1 shows a schematic, three-dimensional view of part of an interior space in an aircraft to be assembled, with an embodiment of a processing device according to an embodiment of the present invention.

FIG. 1 shows a schematic, three-dimensional view of part of an interior space in an aircraft to be assembled, with an embodiment of a processing device 1 according to the present invention. The aircraft is here an airplane. The processing device 1 encompasses a positioning frame 2, a guide device 3 and a movable tool arm 4.

The positioning frame 2 here encompasses a support structure comprised of several carriers 21 configured like a framework. The positioning frame 2 is attached to a segment of a hall floor (not shown). The term "hall floor" stands for any type of floor on which the aircraft to be assembled is standing.

The guide device 3 is a device for moving, controlling and/or guiding the entire processing device 1, the movable tool arm 4, the tool holder 6 and/or the tool to be accommodated therein. The guide device 3 is here movably guided on an upper surface of the positioning frame 2, and in particular on an upper side of a carrier 21 of the positioning frame 2. Rails, chains, belts or the like can be used for movable guidance.

The movable tool arm 4 is here a robot arm, and encompasses a drive and controller for moving the tool arm 4, the tool holder 6 and/or the tool to be accommodated therein. The movable tool arm 4 is attached directly to and next to the guide device 3. The free end of the movable tool arm 4 exhibits a tool holder 6. The tool holder 6 is here a holder or tool changer for a tool for processing the airplane components for assembling the airplane. These components can be brackets for line systems, the line systems themselves, technical equipment, devices and the like, e.g., thermal insulation, hydraulic, electrical, water and air conditioning lines, electrical and optical control lines, mounting rails, seating rails, the seats themselves, etc.

The tool (not shown) for processing components of the airplane can be a drilling tool, a countersinking tool, a riveting tool, a sealing tool, a laser, some other production tool, a measuring tool, combinations thereof or the like.

Figure 2:
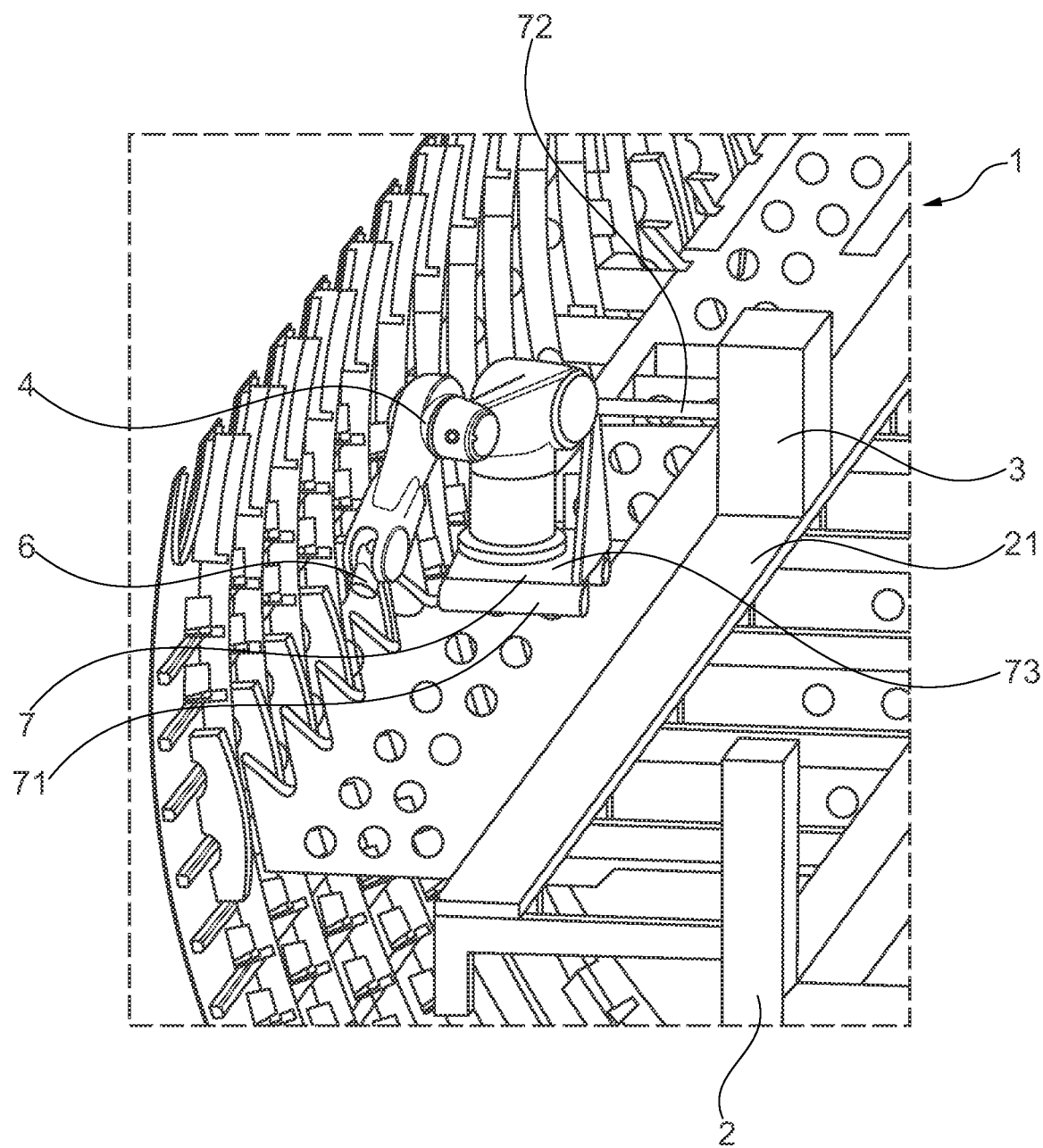
FIG. 2 shows a schematic, three-dimensional view of part of an interior space in an aircraft to be assembled, with an additional embodiment of a processing device according to an embodiment of the present invention.

FIG. 2 shows a schematic, three-dimensional view of part of an interior space in an airplane to be assembled, with an additional embodiment of a processing device 1 according to the present invention. As before, the processing device 1 encompasses a positioning frame 2, a guide device 3 and a movable tool arm 4.

As opposed to FIG. 1, the movable tool arm 4 is here attached to the guide device 3 by way of a carriage 7. The carriage 7 encompasses an arm 72 for attachment to the guide device 3, and a platform 73 for carrying the movable tool arm 4 from below. Relative to the fuselage segment and viewed in the longitudinal direction of the aircraft, the carriage 7 is here situated vertically next to the movable tool arm 4. The carriage 7 encompasses a support device 71 to be supported on a floor plate in the interior space of the airplane. The support device 71 here encompasses two rollers with which to interact, i.e., for purposes of support and rolling over the floor plate.

Figure 3:
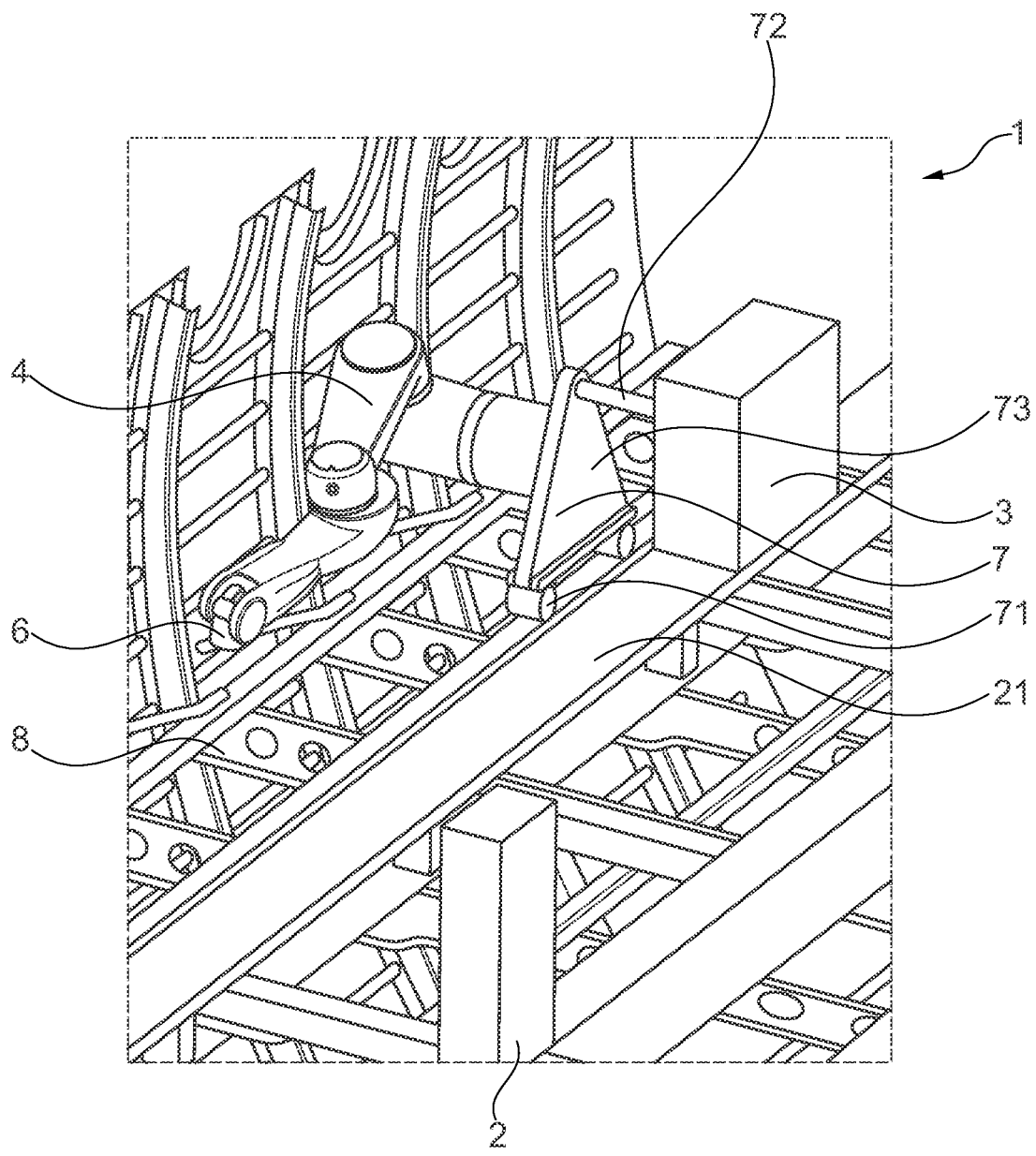
FIG. 3 shows a schematic, three-dimensional view of part of an interior space in an aircraft to be assembled, with an additional embodiment of a processing device according to an embodiment of the present invention.

FIG. 3 shows a schematic, three-dimensional view of part of an interior space in an airplane to be assembled, with an additional embodiment of a processing device 1 according to the present invention. Just as in the preceding figures, FIG. 3 shows a positioning frame 2, a guide device 3 and a movable tool arm 4. The positioning frame 2 is here connected not only with a hall floor (not shown), but additionally with cross members 8 of a floor grate.

As on FIG. 2, the movable tool arm 4 is here attached to and laterally next to the guide device 3 by way of a carriage 7. The carriage 7 encompasses an arm 72 for attachment to the guide device 3 and a platform 73, which as opposed to FIG. 2 is designed for laterally supporting and holding the movable tool arm 4. As on the preceding FIG. 2, the carriage 7 encompasses a support device 71 to be supported on a floor plate in the interior space of the airplane. Here as well, the support device 71 encompasses two rollers with which to interact, i.e., for purposes of support and rolling over the floor plate.

Figure 4A:
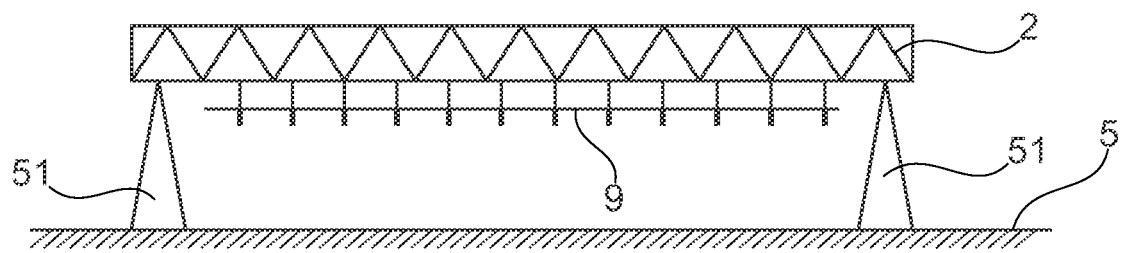
FIGS. 4a-4c show schematic side views of part of a processing device according to an embodiment of the present invention.
Figure 4B:
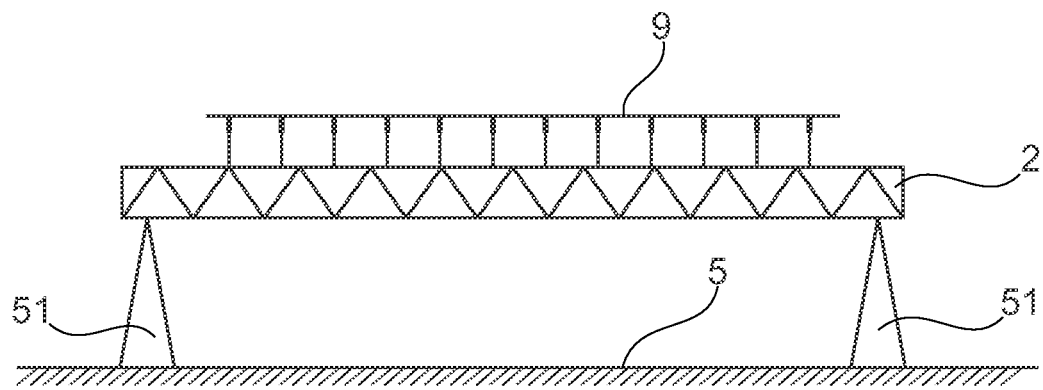
Figure 4C:
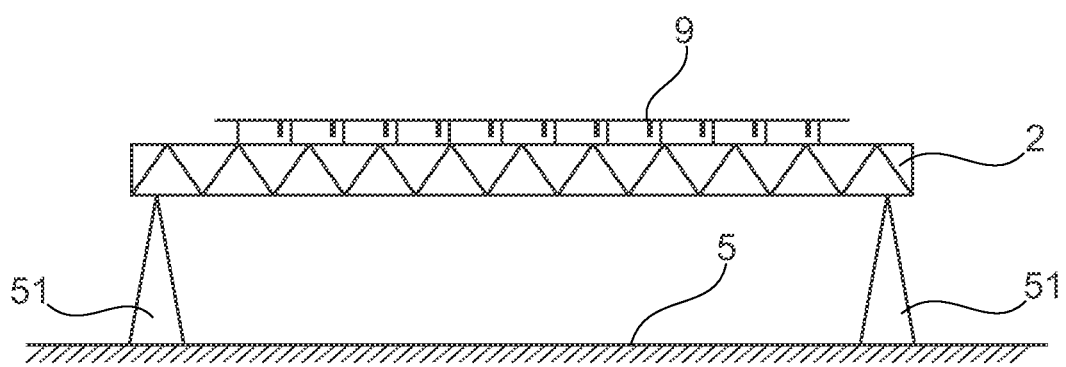

FIGS. 4a-4c show three schematic side views of the positioning frame 2. In all cases, the positioning frame 2 encompasses a support structure comprised of several carriers. The positioning frame 2 is connected to the hall floor 5. The positioning frame 2 is here detachably connected with the hall floor 5 by means of carrying elements 51 in the form of supports. The positioning frame 2 rests on the carrying elements 51, which in turn are standing on the hall floor 5.

The positioning frame 2 is additionally connected with a segment of the aircraft to be assembled. To this end, the support structure of the positioning frame 2 on FIG. 4a is secured from above to a surface of a floor grate 9 of the aircraft, and in particular to a seating rail. On FIG. 4b, the support structure of the positioning frame 2 is secured from below to the bottom side of the floor grate 9, and in particular to a cross member of the floor grate 9. On FIG. 4c, the support structure of the positioning frame 2 is secured from below to the bottom side of the floor grate 9, and in particular to the seating rail.

In addition, let it be noted that "encompassing" does not preclude any other elements or steps, and that "a" or "an" does not rule out a plurality. Let it further be noted that features or steps described with reference to one of the above exemplary embodiments can also be used in combination with other features or steps in other exemplary embodiments described above. Reference numbers in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A processing device for the assembly of aircraft, the processing device comprising:
   a positioning frame in the form of a support structure comprising a plurality of carriers configured as a framework;
   a guide device; and
   a movable tool arm;
   wherein the positioning frame is configured to be detachably attached to a segment of a hall floor,
   wherein the guide device is movably guided on at least one of the plurality of carriers of the positioning frame using at least one of rails, chains or belts,
   wherein the at least one of the plurality of carriers comprises the at least one of rails, chains or belts,
   wherein the movable tool arm is directly attached to the guide device, and a free end of the movable tool arm comprises a tool holder, and
   wherein the positioning frame is additionally connected with a segment of the aircraft to be assembled.

2. The processing device of claim 1, wherein the movable tool arm is a robot arm, a tripod, or a hexapod.

3. The processing device of claim 1, wherein the tool holder is a holder for a drilling tool, a countersinking tool, a riveting tool, a sealing tool, a laser, or a measuring tool.

4. The processing device of claim 1, wherein the guide device is movably guided on at least one of an upper surface, a lateral surface and a lower surface of the positioning frame.

5. The processing device of claim 1, wherein at least one of the guide device, the tool arm and the tool holder comprises at least one sensor element for determining the position.

6. The processing device according to claim 1, wherein the movable tool arm is directly attached to the guiding device or the movable tool arm is attached to the guiding device by way of a support arm.

7. A processing method for the assembly of aircraft, the method comprising:

detachably attaching a positioning frame to a segment of a hall floor, wherein the positioning frame is in the form of a support structure comprising a plurality of carriers configured as a framework;

guiding a guide device on at least one of the plurality of carriers of the positioning frame along at least one of rails, chains or belts; and connecting the positioning frame additionally with a segment of the aircraft to be assembled, wherein the guide device comprises a movable tool arm directly attached to the guide device, and wherein the free end of the tool arm comprises a tool holder.

* * * * *